(12) United States Patent
Brickell et al.

(10) Patent No.: US 7,395,246 B2
(45) Date of Patent: Jul. 1, 2008

(54) DELEGATING DIGITAL CREDENTIALS

(75) Inventors: Ernie F. Brickell, Portland, OR (US); Wesley Deklotz, Portland, OR (US); Jeff U. Glover, Portland, OR (US); Michael R. Premi, Portland, OR (US); Matthew D. Wood, Hillsboro, OR (US); Marion H. Shimoda, Aloha, OR (US)

(73) Assignee: Intel Corporation, Santa Clara, CA (US)

( * ) Notice: Subject to any disclaimer, the term of this patent is extended or adjusted under 35 U.S.C. 154(b) by 89 days.

(21) Appl. No.: 09/998,549

(22) Filed: Nov. 28, 2001

(65) Prior Publication Data

US 2002/0083014 A1 Jun. 27, 2002

Related U.S. Application Data

(63) Continuation-in-part of application No. 09/608,402, filed on Jun. 30, 2000, now Pat. No. 6,965,881.

(51) Int. Cl.
*G06Q 99/00* (2006.01)
(52) U.S. Cl. .............................. 705/76; 705/44; 705/18
(58) Field of Classification Search ................. 713/157; 380/30, 23, 25; 340/825.31, 825.34; 705/76, 705/75, 18, 44
See application file for complete search history.

(56) References Cited

U.S. PATENT DOCUMENTS

| | | | |
|---|---|---|---|
| 5,224,163 A * | 6/1993 | Gasser et al. ................. | 380/30 |
| 5,235,642 A | 8/1993 | Wobber et al. | |
| 5,530,438 A | 6/1996 | Bickham et al. | |
| 5,615,110 A | 3/1997 | Wong | |
| 5,659,616 A | 8/1997 | Sudia | |
| 5,712,914 A | 1/1998 | Aucsmith et al. | |
| 5,845,070 A | 12/1998 | Ikudome | |
| 5,878,138 A | 3/1999 | Yacobi | |
| 5,943,423 A | 8/1999 | Muftic | |
| 5,963,915 A | 10/1999 | Kirsch | |
| 5,983,208 A | 11/1999 | Haller et al. | |
| 5,995,756 A | 11/1999 | Hermann | |
| 6,021,202 A | 2/2000 | Anderson et al. | |
| 6,047,270 A | 4/2000 | Joao et al. | |
| 6,064,990 A | 5/2000 | Goldsmith | |

(Continued)

FOREIGN PATENT DOCUMENTS

DE    EP084838 A1    6/1998

(Continued)

OTHER PUBLICATIONS http://www.valicert.com/products/product_services.html, *E-Transactions Just Got a Lot Safer*, Valicert, Inc.

(Continued)

*Primary Examiner*—Pierre Eddy Elisca
(74) *Attorney, Agent, or Firm*—Fish & Richardson P.C.

(57) ABSTRACT

The system includes receiving, from a delegator, a designation of a role and a delegate to assume the role, receiving, from a credential service provider, an indication that the designation is valid, issuing a delegation credential in response to receiving the indication, and issuing a confirmation to the delegator, which indicates that the delegation credential was issued.

18 Claims, 8 Drawing Sheets

U.S. PATENT DOCUMENTS

| | | | |
|---|---|---|---|
| 6,105,010 A | 8/2000 | Musgrave | 705/44 |
| 6,111,506 A | 8/2000 | Yap et al. | 340/572.1 |
| 6,119,230 A | 9/2000 | Carter | |
| 6,157,953 A * | 12/2000 | Chang et al. | 709/225 |
| 6,275,941 B1 | 8/2001 | Saito et al. | |
| 6,311,163 B1 | 10/2001 | Sheehan et al. | |
| 6,321,339 B1 | 11/2001 | French et al. | |
| 6,353,886 B1 | 3/2002 | Howard et al. | |
| 6,408,330 B1 | 6/2002 | De La Huerga | |
| 6,418,467 B1 | 7/2002 | Schweitzer et al. | |
| 6,424,249 B1 | 7/2002 | Houvener | |
| 6,442,526 B1 | 8/2002 | Vance et al. | |
| 6,601,192 B1 * | 7/2003 | Bowman-Amuah | 714/38 |
| 6,931,545 B1 | 8/2005 | Ta et al. | |
| 6,934,838 B1 | 8/2005 | Boyce et al. | |
| 6,965,881 B1 | 11/2005 | Brickell et al. | |
| 7,062,471 B1 | 6/2006 | Matsuyama et al. | |
| 7,106,843 B1 | 9/2006 | Gainsboro et al. | |
| 2001/0037388 A1 | 11/2001 | Suzuki | |
| 2002/0120573 A1 | 8/2002 | McCormick | |
| 2003/0086594 A1 | 5/2003 | Gross | |
| 2005/0198356 A1 | 9/2005 | Delaney et al. | |
| 2005/0198536 A1 | 9/2005 | Brickell et al. | |

FOREIGN PATENT DOCUMENTS

| | | | |
|---|---|---|---|
| JP | EP0786728 A1 | | 7/1997 |
| JP | 2001134534 A | * | 5/2001 |
| JP | 2002222251 A | * | 8/2002 |

OTHER PUBLICATIONS http://www.valicert.com/products/product_services.html, E-Transactions Just Got a Lot Safer, Valicert, Inc.

Menezes et al., Handbook of Applied Crytography, pp. 559-566 (1997).

Aberdeen Group, "Evaluating the Cost of Ownership for Digital Certificate Projects," Aberdeen Group Inc., www.directoryservice.com/WP/Aberdeen/EvalCOO.htm, 1998.

Matonis, "User-Friendly Digital Signatures," Oct. 2000, Hush Communications, www.consult.hyperion.co.uk/PDFlibrary/y2000/matonis.pdf, Oct. 2000.

Magic, Inc., "Meteor Security: Some Speculations," Magic Inc., www.immagic.com/TOC/elibrary/TOC/meteor/downloads/MeteorSecurity.pdf, Aug. 2000.

State of Colorado Senate Bill 97134 LLS No. 970530.01, www.state.co.us/gov_dir/leg_dir/sbills/SB134.htm, 1991.

SPKI Requirements, C. Ellison, Sep. 1999, pp. 1-14.

SPKI Certificate Theory, C. Ellison, et al., Sep. 1999, pp. 1-41.

Simple Public Key Certificate, C. Ellison, et al., Jul. 26, 1999, pp. 1-44.

SPKI Examples, C. Ellison, et al., Mar. 10, 1998, pp. 1-15.

An Infrastructure for Authentication and Delegation, Harold Myrvang, May 22, 2000, 100 pages.

* cited by examiner

Activity Log   May 2000

Digital Certificate 1.234.5.6778.9

*Jon Smith (Primary Owner)*

| | | | | | |
|---|---|---|---|---|---|
| 10/15/99 | 10:02 AM | www.amazon.com | Office | $15.25 | Approved |
| 10/15/99 | 11:04 AM | www.ebay.com | Office | $100.25 | Approved |
| 10/15/99 | 09:36 PM | www.amazon.com | Home | $56.65 | Approved |
| 10/15/99 | 04:32 PM | www.etoys.com | Portable | $25.65 | Approved |

*Susan Johnson (Delegate)*

| | | | | | |
|---|---|---|---|---|---|
| 10/15/99 | 10:02 AM | www.healthcare.com | Work | document accessed | Approved |
| 10/15/99 | 10:05 AM | www.healthcare.com | Work | document submitted | Approved |
| 10/15/99 | 10:08 AM | www.healthcare.com | Work | document accessed | Approved |
| 10/15/99 | 10:09 AM | www.healthcare.com | Work | document accessed | Approved |

*Albert White (Delegate)*

| | | | | | |
|---|---|---|---|---|---|
| 10/15/99 | 07:42 AM | www.healthcare.com | Work | document accessed | Approved |
| 10/15/99 | 11:07 AM | www.bankone.com | Work | transfer $1,000 | Rejected |

DELEGATING DIGITAL CREDENTIALS

CROSS-REFERENCE TO RELATED APPLICATION

This application is a continuation-in-part of U.S. patent application Ser. No. 09/608,402, filed on Jun. 30, 2000 now U.S. Pat. No. 6,965,881 and entitled "Digital Credential Usage Reporting".

TECHNICAL FIELD

This invention relates to delegating digital credentials for use in accessing services.

BACKGROUND

Cryptography provides the basis for a number of privacy and authentication mechanisms used in computer-based systems. One such mechanism is a digital signature, which is often used to authenticate the sender of an electronic message. To create a digital signature, the sender first creates a private signature key and a corresponding public verification key. To sign a message or other document, the sender performs a computation that takes as input the message and the private signature key and produces as output a digital signature for that message. To verify a digital signature, a receiver performs a computation that takes as input the message, the digital signature for that message, and the public verification key, and produces as output either "signature verified" or "signature failed to verify."

In order to facilitate the authentication of a digitally signed document, the receiver must be assured that the public verification key that is used to verify the signature is indeed the public verification key belonging to the sender of the message. Typically, the receiver will obtain a digital certificate, which contains the identity of the sender, the public verification key of the sender, and other information. Typically, this digital certificate is digitally signed by a certification authority. Other mechanisms are also used for establishing the correspondence between an identity and a public verification key such as an entry in a database.

DESCRIPTION OF THE DRAWINGS

FIG. 3 is an example activity log.

DESCRIPTION

A user's "digital credential", as used herein, refers to the security mechanisms associated with the user's identity. For example, a user's digital credential can include one or more digital signature keys relating to one or more digital certificates. In addition, a user's digital credential can be any other suitable cryptographic security mechanism, such as a mechanism for use in a proprietary cryptographic scheme.

Validating a user's digital credential, therefore, can include one or more tasks. Examples include verifying that the user's digital signature is valid using the public key in the user's digital certificate and validating the digital certificate, which can include several additional tasks such as using a key of the certification authority to validate that the digital signature on the digital certificate is valid, verifying that the digital certificate has not been revoked or suspended, and validating the key of the certification authority.

Figure 1:
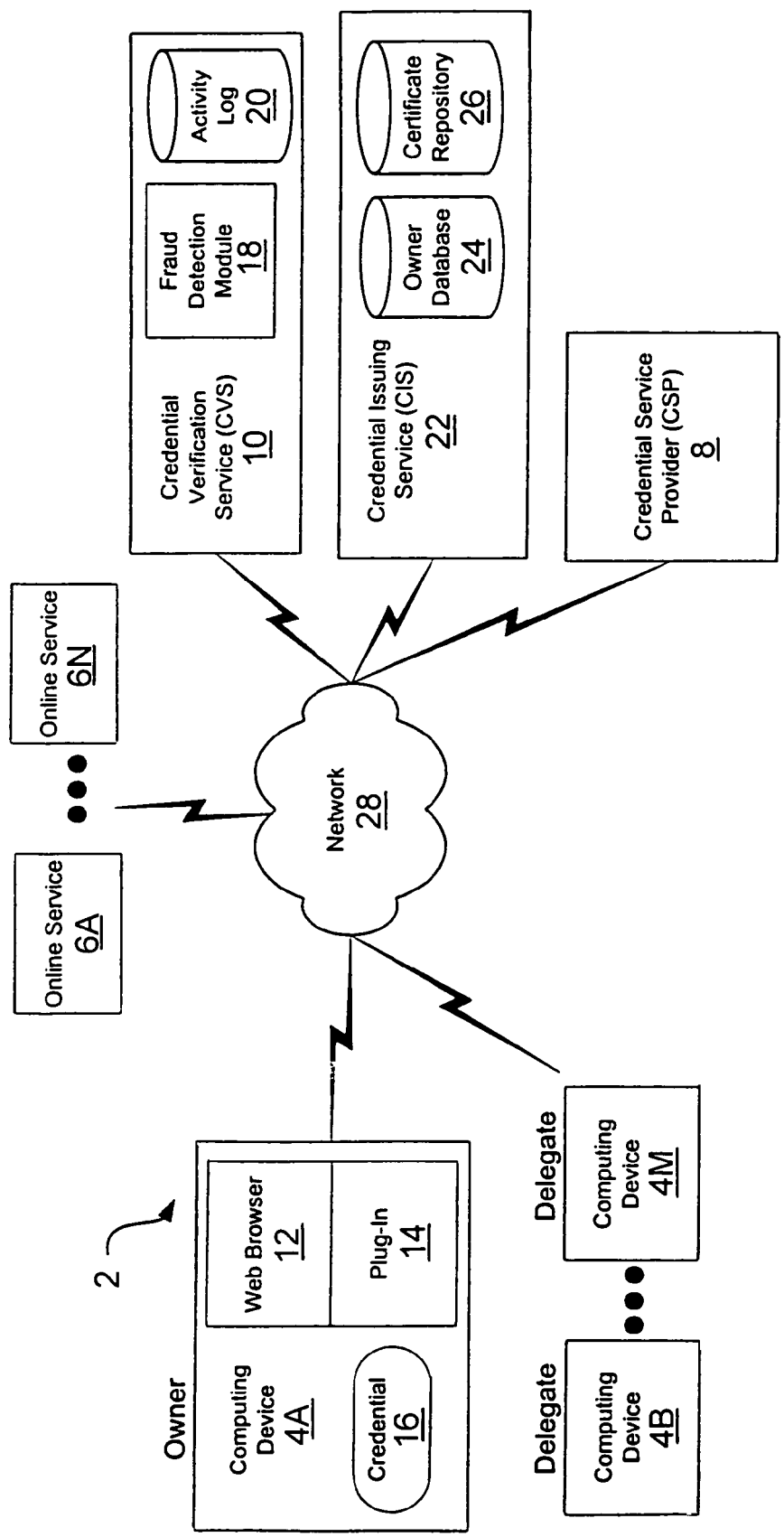
FIG. 1 is a block diagram illustrating one example of a system that monitors the usage of digital credentials.

FIG. 1 is a block diagram illustrating one example of a system 2 that tracks the usage of digital credentials, generates activity reports, and identifies potential fraudulent activities or other misuse. As explained in detail below, system 2 allows timely detection of fraudulent activity or general misuse of digital credentials.

Web browser 12, such as Internet Explorer™ from Microsoft™ Corporation of Redmond, Wash., executes in an operating environment provided by computing device 4A and allows an owner of digital credential 16 to remotely access online services 6 via network 28. Generally, online services 6 represent Web-based venues that support secure electronic transactions. For example, online services 6 can be Web-based retailers of consumer products such as books, movies, software, toys, games and the like. Alternatively, online services 6 can be business-to-business Web sites such as online marketplaces for medical and other supplies. Other examples include online banking institutions, brokerage firms, and health care services. Similarly, authorized delegates of the user use Web browsers (not shown) executing on computing devices 4B through 4M to access online services 6 and conduct secure transactions using a digital credential that has been authorized by the user to act on behalf of the user for specified uses.

Computing devices 4 represents general purpose computing systems suitable for interacting with network 28. One example of a suitable computing device 4 is a personal computer. In addition, each computing device 4 can be a laptop computer, a handheld computer, a personal digital assistant (PDA), such as a Palm™ organizer from Palm Inc. of Santa Clara, Calif., or even a network-enabled cellular telephone. Network 28 represents any communication network, such as a packet-based digital network like the Internet.

Credential service provider (CSP) 8 provides a central service by which a user can manage his or her digital credentials. More specifically, CSP 8 allows a user to request a digital credential, revoke a digital credential and define one or more delegates that are authorized to use their own digital credential to act in behalf of the user for specified functions.

In order to obtain digital credential 16, the user directs Web browser 12 to CSP 8, generates a private signature key and a public verification key, and requests a digital certificate. The user submits the public verification key and a variety of information, such as name and address, that is validated during the application process.

CSP 8 submits the information to credential issuing service (CIS) 22 that, as a certificate authority, issues a corresponding digital credential 16, including a digital certificate and signature key, and records the owner information in owner database 24. In this fashion, the user becomes the "owner" of his or her digital credential 16. After CIS 22 issues digital credential 16 the owner can access CSP 8 and designate one or more authorized delegates.

The owner uses digital credential 16 to securely access online services 6, present digitally signed documents and otherwise conduct secure transactions. In one configuration, Web browser 12 establishes a secure communication link with a Web server at one of the online services 6 using a secure communications protocol, such as the Secure Socket Layer (SSL). When accessed, the Web server issues a "challenge" to Web browser 12. Web browser 12 responds by signing the challenge with his private signature key and communicating digital credential 16 and the signed challenge to online service 6. In another configuration, Web browser 12 uses his private signature key to digitally sign a document presented to online server 6, such as when the owner or delegate is submitting a confidential medical diagnosis or a prescription request to a Web-based health care service.

Online services 6 can opt to validate digital credential 16 directly, such as by verifying the digital signatures using the public key and by checking a local database to verify the association between the public key and the user. However, online services 6 can also communicate the digital credential 16 to credential verification service 10 (CVS) for verification. In one configuration, online services 6 validate transactions of low monetary value locally and use CVS 10 to validate high value transactions.

To validate a digital credential 16, CVS 10 receives the digital credential, such as the digital signature and the digital certificate, from online services 6 and interacts with CIS 22. CVS 10 accesses CIS 22 to obtain the public key for CIS 22, as a certificate authority, and verifies the digital signature. Next, CVS 20 accesses CIS 22 to determine whether digital credential 16 has been revoked, as indicated by certificate repository 26. CVS 20 stores the result of the verification, whether successful or not, in activity log 20.

In one configuration, CSP 8 allows the user to generate a number of digital signature keys associated with his identity and assign a "friendly name" to each key. For example, the user may assign names such as: Office Key, Home Key, Portable Key. As described below, this allows the user to more readily track usage of the digital signature keys.

System 2 incorporates many features that allow an owner or delegate to detect unauthorized use of the digital signature key in the event digital signature key is misappropriated or otherwise misused. For example, when verifying digital signature during each secure transaction, CVS 10 can automatically send an activity report to Web browser 12, which can display the activity report to the user. In this fashion the user can readily identify whether the digital signature key is being misused.

In addition, the owner or delegate can access CSP 8 and request an activity report that details any usage of digital signature key. Upon receiving such a request, CSP 8 communicates the request directly to CVS 10. CVS 10 examines activity log 20, extracts the relevant activity information, formulates a report and communicates the report to CSP 8. CSP 8 electronically presents the report to the user via network 28. The owner or delegate can also configure CSP 8 to periodically generate the report and electronically mail the report to the user. Alternatively, CSP 8 can mail a physical copy of the report to the user.

In addition to the above-described techniques by which an owner or delegate can detect misuse of digital credential, fraud detection module 18 of CVS 10 applies fraud detection techniques to activity log 20 in order to automatically identify misuse. As described in detail below, fraud detection module 18 analyzes activity log 20 to identify any unusual patterns that may indicate misuse.

Figure 2:
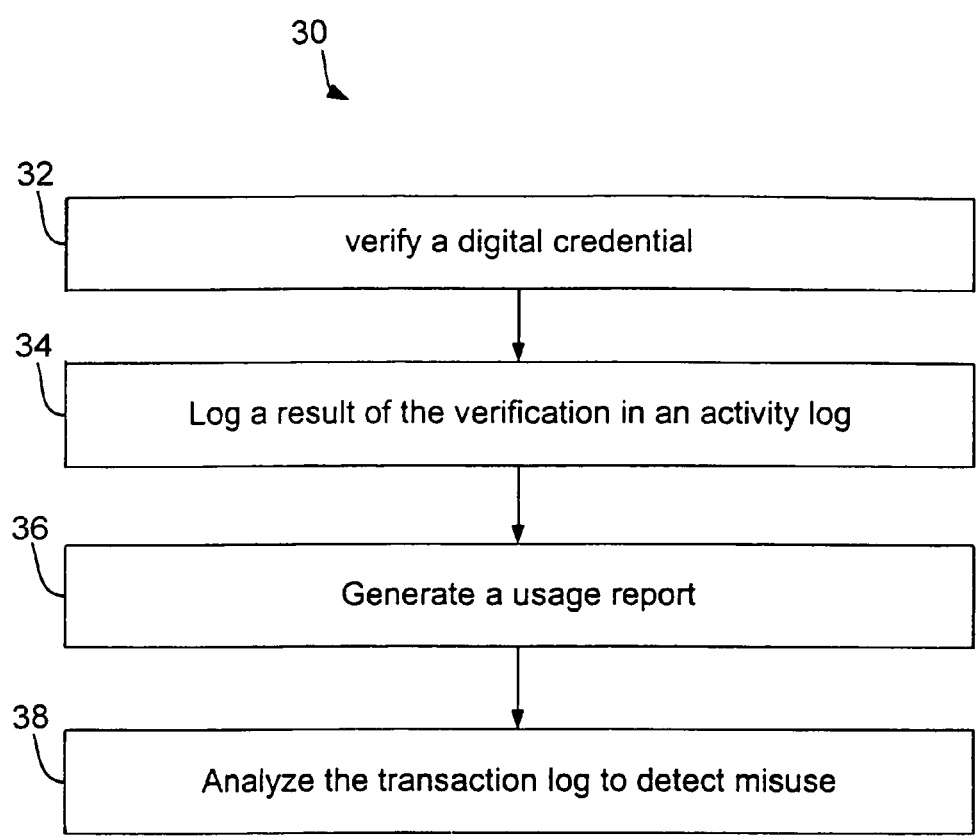
FIG. 2 is a flow chart illustrating one example of a process for monitoring the usage of digital credentials.

FIG. 2 is a flow chart illustrating a process 30 further illustrating how system 2 monitors the usage of digital signature keys and identifies potential fraudulent activities or general misuse. Each online service 6 processes secure transactions by communicating digital credential 16 to CVS 10 for verification (32). As described above, CVS 10 cooperates with CIS 22 to verify digital credential 16 including determining whether digital credential 16 is revoked. In one configuration, however, online services validate the digital credential and communicate transaction information to CVS 10.

CVS 10 stores the result of each verification in activity log 26 (34). In addition, CVS 10 stores relevant transaction information such as a date and time of the transaction, the online service 6 that is involved in the transaction, the type of transaction, the device used to access the online service 6, such as a laptop computer, cell phone or a PDA, the value of the transaction, and location and position information, such as an IP address or a name of computing device 4.

In order to facilitate the timely identification of misuse of digital credential 16, CVS 10 generates activity reports that detail the information stored in activity log 20 (36). As discussed above, CVS 10 generates the activity reports in a variety of ways and at a variety of times. For example, CVS 10 can automatically generate an activity report when handling each verification request, thereby frequently providing the information to the user. In addition, CVS 10 can periodically generate activity reports or upon request by the owner.

CVS 10 also tailors each activity report to the requester such that the owner of digital credential 16 can view all activity, including any activity by the delegates. An individual delegate, however, can only view activity reports that list his or her activity.

Fraud detection module 18 of CVS 10 analyzes activity log 20 to identify any unusual patterns in order to identify fraudulent activities. For example, a significant increase in the number or the size of the transactions can indicate misuse. A change in the types of transactions can indicate misuse. In addition, any indication that digital signature key 16 is suddenly being used from a different computing device, such as a change from a frequently used internet protocol (IP) address to a previously unused IP address, can also indicate misuse. Upon detecting potential misuse, CVS 10 communicates an activity report to the owner alerting him or her of the activity. In this manner, the owner can readily determine whether any fraudulent activity or general misuse has indeed occurred and the extent of the activity.

If the owner determines that unauthorized activities have indeed occurred, the owner can access CSP 8 and revoke digital credential 16. For example, the owner can revoke the associated digital certificate. Alternatively, the owner can create a new private signature key and a new public verification key and sign this public verification key with the old private signature key. System 2 can issue a new digital certificate for this new verification key. CSP 8 communicates the revocation to CIS 22, which updates the status of digital credential 16 in certificate repository 26, thereby causing any future verifications by CVS 10 of the digital credential to fail. Thus, the owner can immediately stop the fraudulent activity.

In addition, the activity report can be provided to an authorized operator of CSP 8 of CVS 10. Furthermore, an activity report detailing activity at a specific online service 6 can be generated and provided to an authorized operator at the online service.

It this manner, system 2 helps detect unauthorized use of the digital signature key in the event digital signature key is misappropriated. These features are especially advantages to professional services such as the healthcare profession. To further illustrate these benefits, consider a healthcare professional accessing a healthcare oriented online service and requesting access to healthcare information or seeking to submit a prescriptions or diagnosis. The online service communicates transaction information describing the access request and the medical professional's digital credential to the central credential verification service. Upon receiving a verification result from the credential verification service, the healthcare oriented service provides access to the medical records. Subsequently, the healthcare oriented service receives an activity report from the credential verification service and provides the report to healthcare professional.

FIG. 3 is an example activity report 40 generated by CVS 10. Activity report 40 lists the activities logged in activity log 20, broken down by owner and delegate. For each authentication request, the example activity report 40 lists the date and time, the online service involved in the transaction, the name of the computing device 4 used by the user to originate the transaction, the value of the transaction, the type of the transaction, and the authentication result.

Figure 4:
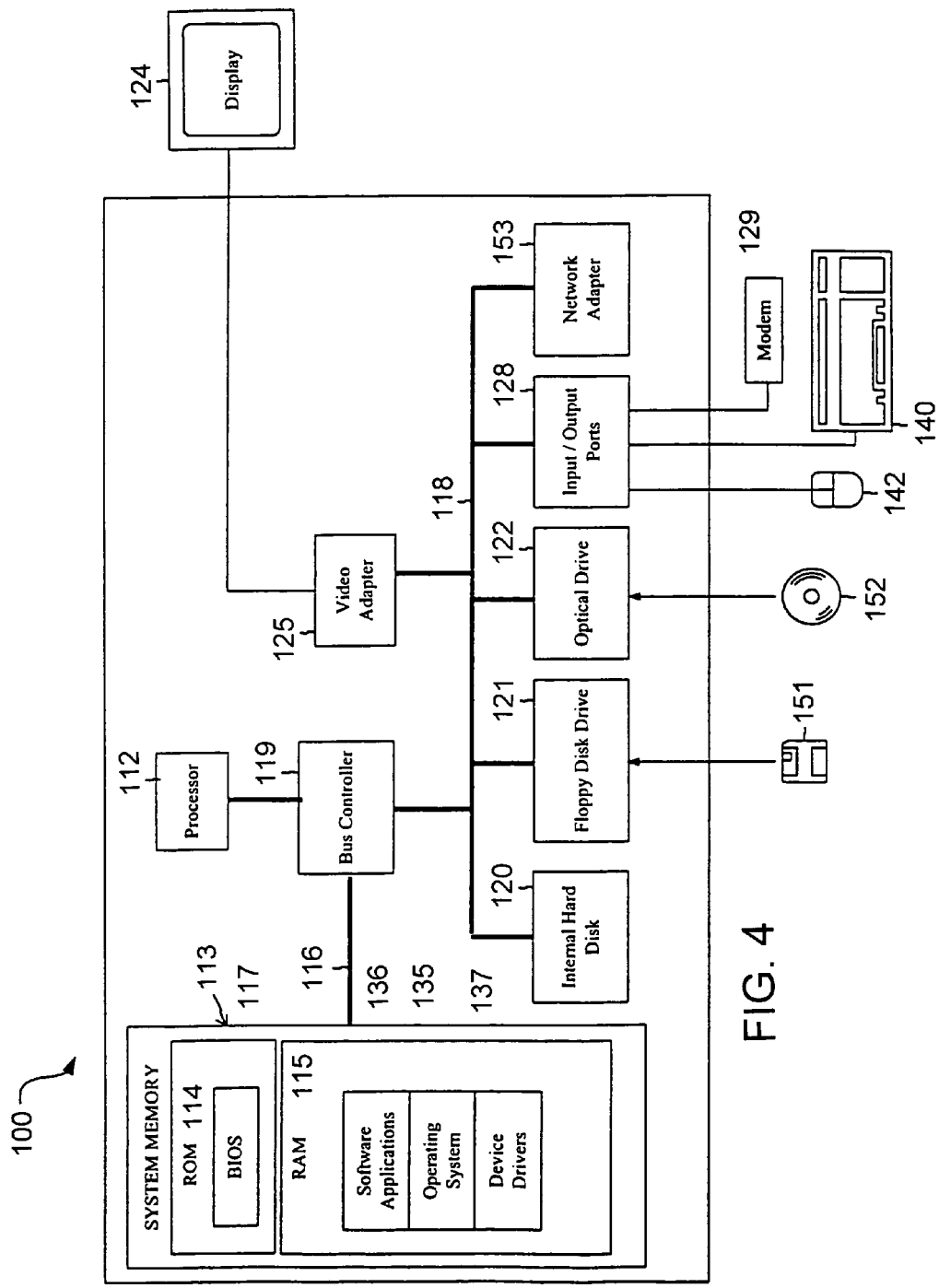
FIG. 4 is a block diagram illustrating a computer suitable for implementing embodiments of the invention.

FIG. 4 illustrates a programmable computing system (system) 100 that provides an operating environment suitable for use as a computing device 4 or as a server within CSP 8, CVS 10 or CIS 22. The system 100 includes a processor 112 that represents any suitable microprocessor such as the PENTIUM® family of microprocessors manufactured by the Intel Corporation of Santa Clara, Calif. Other examples include the MIPS® family of microprocessors, the POWERPC® family of microprocessors from both the Motorola Corporation and the IBM Corporation, the PRECISION ARCHITECTURE® family of microprocessors from the Hewlett-Packard Company, the SPARC® family of microprocessors from the Sun Microsystems Corporation, or the ALPHA® family of microprocessors from the Compaq Computer Corporation. In various configurations, system 100 represents any server, personal computer, laptop or a hand-held PC, a personal digital assistant (PDA) or a network-enabled cellular phone.

System 100 includes system memory 113, including read only memory (ROM) 114 and random access memory (RAM) 115, which is connected to the processor 112 by a system data/address bus 116. Input/output bus 118 is connected to the data/address bus 116 via bus controller 119. In one embodiment, input/output bus 118 is implemented as a standard Peripheral Component Interconnect (PCI) bus. The bus controller 119 examines all signals from the processor 112 to route the signals to the appropriate bus. Signals between the processor 112 and the system memory 113 are merely passed through the bus controller 119. However, signals from the processor 112 intended for devices other than system memory 113 are routed onto the input/output bus 118.

Various devices are connected to the input/output bus 118 including hard disk drive 120, floppy drive 121 that is used to read floppy disk 151, and optical drive 122, such as a CD-ROM drive that is used to read an optical disk 152. The video display 124 or other kind of display device is connected to the input/output bus 118 via a video adapter 125.

Users enter commands and information into the system 100 by using a keyboard 140 and/or pointing device, such as a mouse 142, which are connected to bus 118 via input/output ports 128. Other types of pointing devices (not shown) include track pads, track balls, joysticks, data gloves, head trackers, and other devices suitable for positioning a cursor on the video display 124. System 100 also includes a modem 129 that is typically used to communicate over wide area networks (not shown), such as the Internet using either a wired or wireless connection.

Software applications 136 and data are typically stored via one of the memory storage devices, which may include the hard disk 120, floppy disk 151, CD-ROM 152 and are copied to RAM 115 for execution. In one embodiment, however, software applications 136 are stored in ROM 114 and are copied to RAM 115 for execution or are executed directly from ROM 114.

In general, the operating system 135 executes software applications 136 and carries out instructions issued by the user. The Basic Input/Output System (BIOS) 117 for the system 100 is a set of basic executable routines that have conventionally helped to transfer information between the computing resources within the system 100. Operating system 135 or other software applications 136 use these low-level service routines. In one embodiment system 100 includes a registry (not shown) that is a system database that holds configuration information for system 100.

CVS 10 and CIS 22 may be implemented within the same machine (e.g., computer) as CSP 8 or in separate machines (as shown). The following description assumes that they are all implemented within the same machine.

Delegating Roles

In this embodiment, a delegator, e.g., an owner of a digital credential, can delegate a role or function to a delegate. That is, the delegator need not delegate all of his or her authority to the delegate, but rather a subset thereof. For example, a doctor may delegate to a secretary the ability to view a patient's medical records relating to billing, but not those relating to diagnosis. The same doctor may also delegate to an X-ray technician that same patient's medical records relating to diagnosis, but not to billing. Thus, the doctor is able to delegate partial authority to different types of assistants, without delegating his full authority to anyone.

"Delegation credentials" are a type of digital credential (defined above) that allow the delegator to delegate only some functions or authority to a delegate. The delegation credentials define one or more delegates that are authorized to use a delegator's digital credential to act on behalf of the delegator for specified functions.

Figure 5:
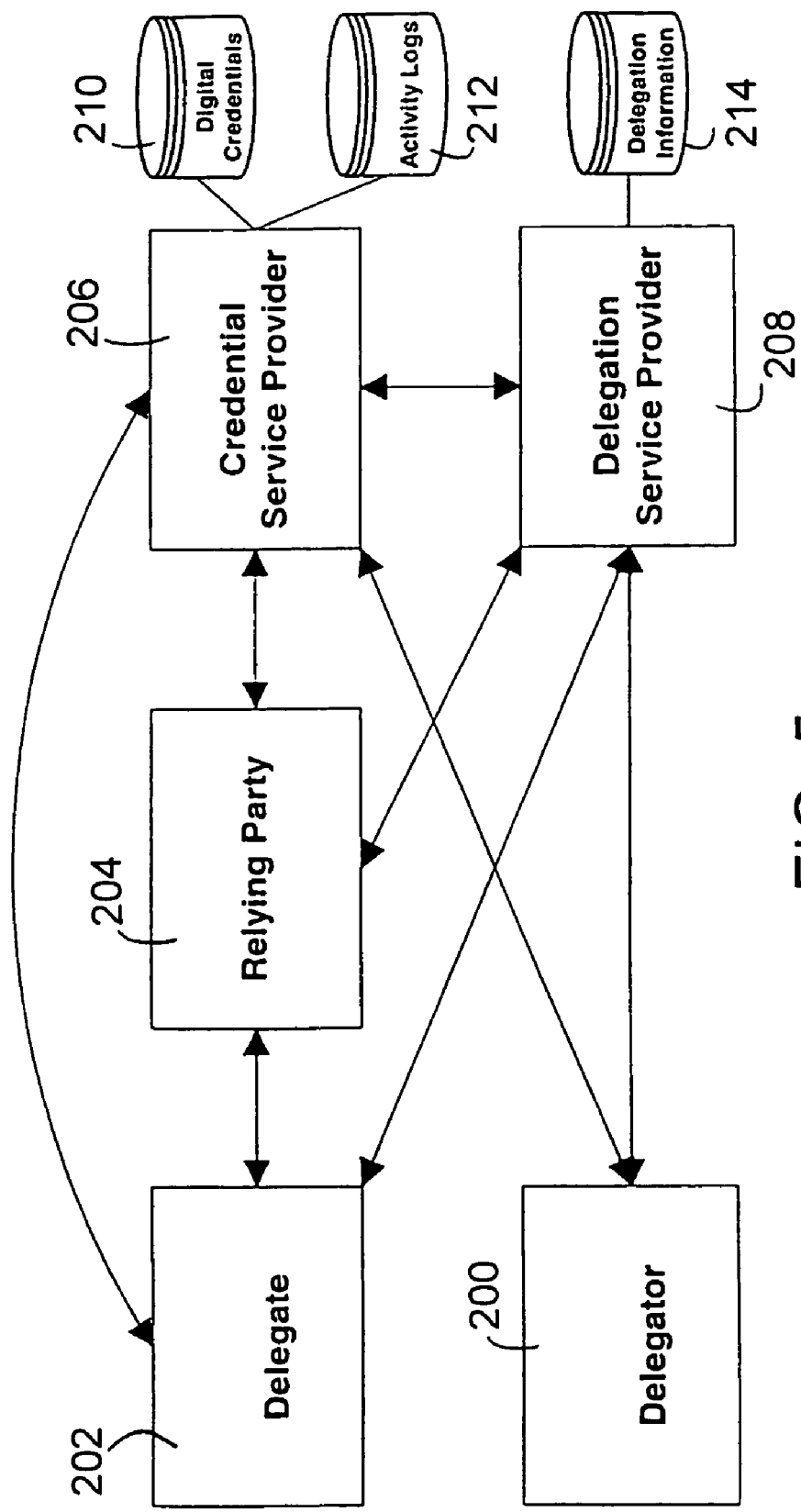
FIG. 5 is a block diagram showing various elements of a delegation transaction.

Referring to FIG. 5, a block diagram is shown which indicates the various elements of a delegation transaction. These elements include a delegator 200, a delegate 202, a relying party 204, a CSP 206, and a delegation service provider (DSP) 208. Each of these elements may be implemented using a programmable computing system, such as system 100 shown in FIG. 4 (the delegator and delegate may be entities who may use a system 100).

Delegator 200 is an entity, such as a person, company, etc., who delegates one or more functions to a delegate 202. Delegate 202 receives the authority to perform those functions using delegation credentials, as described below. Relying party 204 is an entity that provides a requested service in reliance on the delegated credentials of the delegate. For example, relying party 204 may be a Web site that receives delegation credentials (of the delegator) from the delegate and, once they are verified, provides the delegate with access to services (e.g., information) that was previously available only to the delegator.

CSP 206 is as described above and, for the purposes of this embodiment, includes a CVS and CIS. In this regard, CSP 206 maintains access to a database 210 that contains delegation credentials of the delegator and a database 212 that contains activity logs that store information such as which delegation credentials have been delegated to which delegate. Although databases 210 and 212 are shown separately in FIG. 5, they may be a single database.

DSP 208 controls the delegation of delegation credentials to delegates. To this end, DSP 208 maintains a database 214 of delegation information, which identifies delegators, delegates, the functions available to the delegators, and which of those functions, if any, are available to the delegates. DSP 208 and CSP 206 are shown as separate machines in FIG. 5; however, they may be implemented using the same machine.

Figure 6:
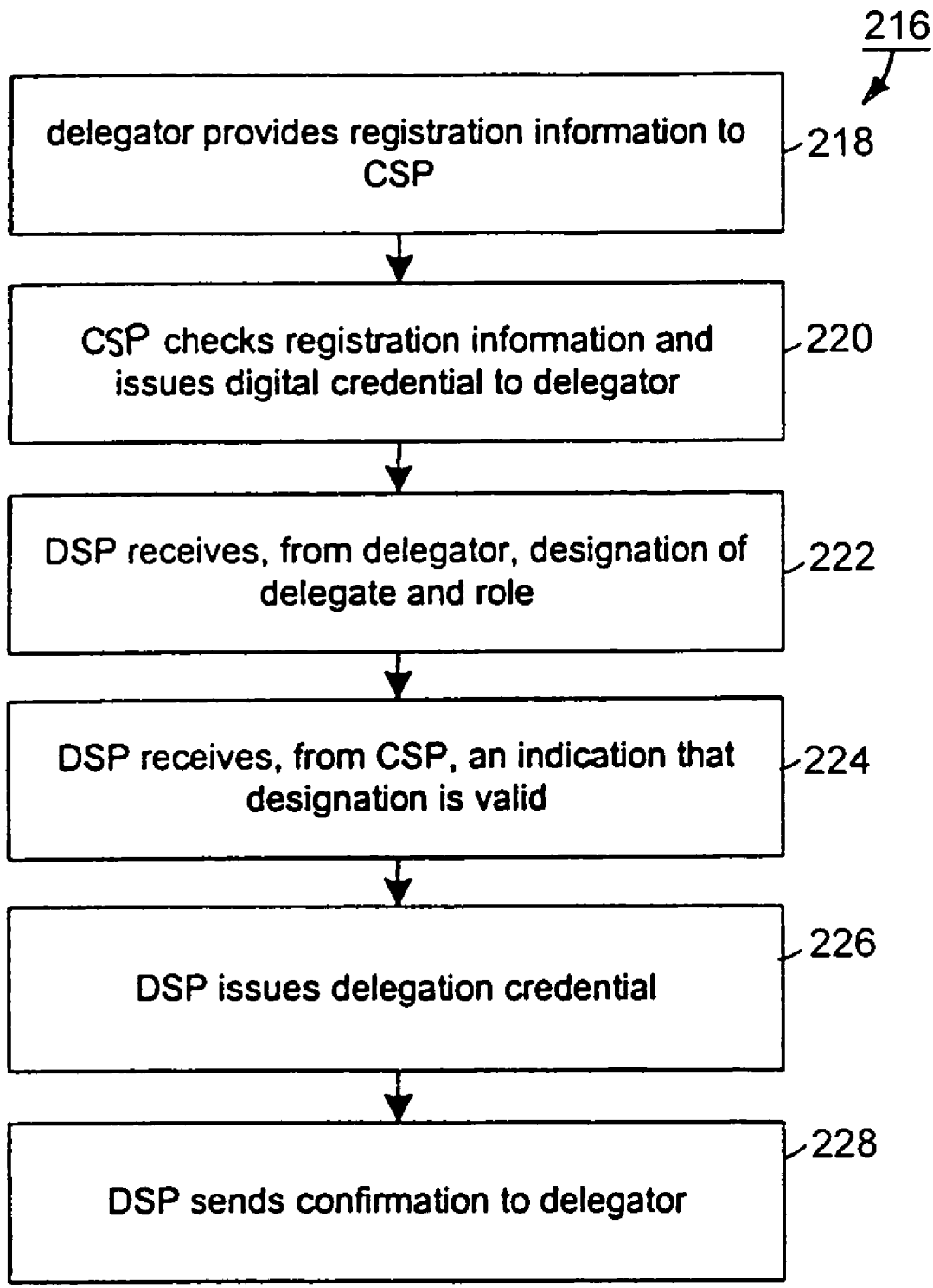
FIG. 6 is a flowchart showing a process for delegating roles to a delegate.

Referring to FIG. 6, a process 216 is shown for providing a delegate with the authority to assume one or more roles of a delegator. Referring to FIGS. 5 and 6, the delegator registers (218) for a digital credential with CSP 206. The delegator provides registration information, such as his identity, professional title, authority, etc. to CSP 206. CSP 206 may contain a database of information about potential subscribers, such as delegator 200. Once delegator 200 enters the registration information, CSP 206 may check (220) the registration information against (e.g., compare it to) information in the database. If there is sufficient correspondence between the registration information and the information stored in the database, CSP 206 may issue (220) a digital credential to delegator 200. It is noted that the checking may be bypassed and CSP 206 may simply issue (220) the digital credential upon receipt of the registration information and, e.g., payment.

Delegator 200 may then delegate one or more roles (e.g., professional titles, authority, functions) to a delegate. To do this, delegator 200 provides DSP 208 with a designation, which includes a role and a delegate to assume the role. Delegator 200 approves the designation using the digital credential that the delegator received during registration. Delegator 200 provides the designation and the digital credential to CSP 206. CSP 206 confirms that the designation did indeed come from the delegator by verifying the delegator's digital credential and informs DSP 208 that the designation is valid. CSP 206 also logs the designation and its approval in database 212.

DSP 208 receives (222) the designation (including the identity of the delegate and role(s)) from delegator 200 and receives the approval from CSP 206. In response to the approval, DSP 208 issues (226) a delegation credential. The delegation credential may be issued (226) directly to the delegator or it may be issued to CSP 206, which will, in turn, provide it to the delegator or to any third party, as needed, where it is stored. The delegation credential contains delegation information, such as the identity of the delegate and the role(s) of the delegator that the delegate may assume.

DSP 208 may store the delegation credential in database 214, along with an indication that the initial designation was approved. DSP 208 may also send (228) a confirmation message to delegator 200 indicating that the requested delegation was created.

Figure 7:
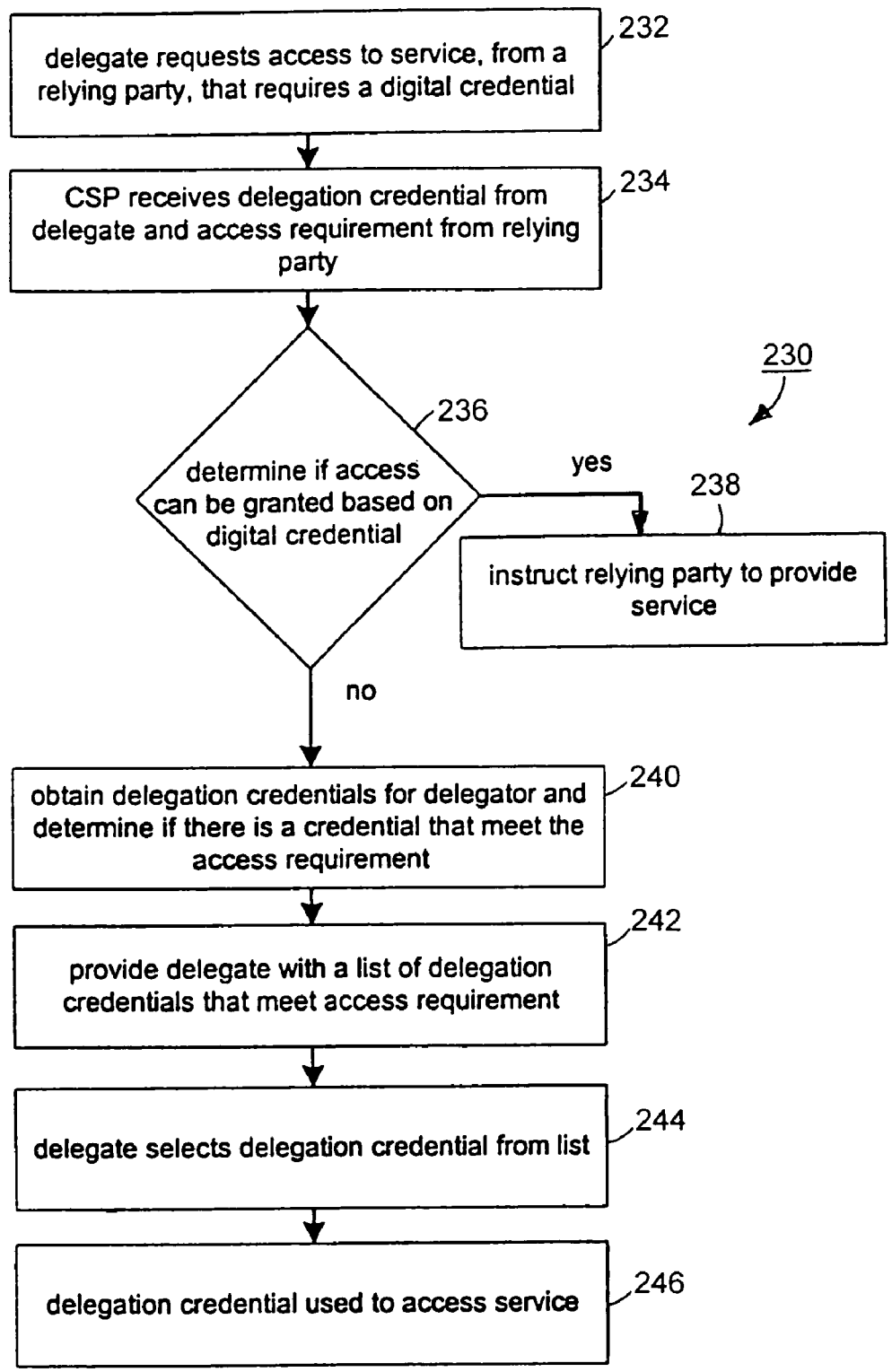
FIG. 7 is a flowchart showing a process for selecting delegation credentials of a delegator.

Referring to FIG. 7, a process 230 is shown in which a delegate uses delegation credentials to access services available to the delegator from a relying party. Delegate 202 requests (232), from a relying party 204 such as a Web site, access to a service that requires a digital credential. In response to the request, relying party 204 sends an access request to the delegate to be approved by a digital credential. The delegate sends a delegation credential in response. CSP 206 receives (234) the delegation credential from the delegate and the access requirements from relying party 204.

CSP 206 determines (236) if the delegation credential is valid for the access requirement. What this means is that CSP 206 determines if, based on the delegation credential, the delegate may access the services of relying party 204. CSP 206 also confirms that the delegation credential is valid by comparing it to stored delegation credentials.

If the delegation credential is valid for the access requirement, CSP 206 informs (238) relying party 204 that the delegation credential is valid. If the delegation credential is not valid for the access requirement, CSP 206 obtains (240) the delegation credentials available to the delegate (e.g., from database 210) and determines (240) if there is a delegation credential that corresponds to the access requirement. If there is more than one delegation credential that is available to the delegate that will satisfy the access requirements of the relying party, CSP 206 provides (242) a list of those delegation credentials to the delegate. The delegate may then select (244), from the list, which of the delegation credentials to use. If no delegation is found, CSP 206 informs relying party 204 that no appropriate delegation is available.

The selected delegation credential may be sent to a verification service, such as a CVS within CSP 206. The verification service compares the delegation credential to a list of permissible delegation credentials for the delegate. If the delegation credential is verified, e.g., it is on the list, the verification service logs that the delegation credential is to be used for access to the service of the relying party and signs a digital statement asserting the validity of the delegation credential for the requested access. The digital statement may be provided to relying party 204.

CSP 206 and relying party 204 receive an indication of which of the delegation credentials the delegate has selected, along with the verification service statement (if applicable). The delegation credential is then used (246) to provide access to the requested service. That is, relying party 204 verifies the verification statement and/or delegation credential and, once verified, provides the requested service to the delegate.

CSP 206 logs the identity of the delegation credential that the delegate uses to access the services of relying party 204. The logs that are kept by CSP 206 may be made available to the delegate and/or the delegator to examine. Thus, the delegator can view all activities that the delegate took on his behalf or reports of such activities. If the delegator (or delegate) finds that an inappropriate action has been taken, he may revoke the delegation credential under which that action was taken. This can be done by communicating a revocation request to DSP 208 and/or CSP 206. Using the stored logs, a delegator is also able to review all of the delegation credentials that he created in order to detect if any were created fraudulently. The delegator is also able to review the delegation credentials created on his behalf by a delegate, if such creation is permitted in the first place.

In other embodiments, DSP 208 could send all of the delegation credentials of the delegate to the relying party and then have the relying party check to see if there are any delegation credentials that satisfy its access requirements. The delegate could store the delegation information instead of, or in addition to, storage on DSP 208. The delegate could then provide this information to the relying party when the delegate requests a service.

The delegate could have a default delegation credential. When multiple delegation credentials meet the access requirements of the relying party, the delegate could be presented with a graphical user interface that includes the default delegation credential pre-selected. The delegate could then just accept the default delegation.

DSP 208 could also send all of the delegation credentials of the delegate to the relying party and then have the relying party check whether there are any delegation credentials that satisfy its access requirements.

Figure 8:
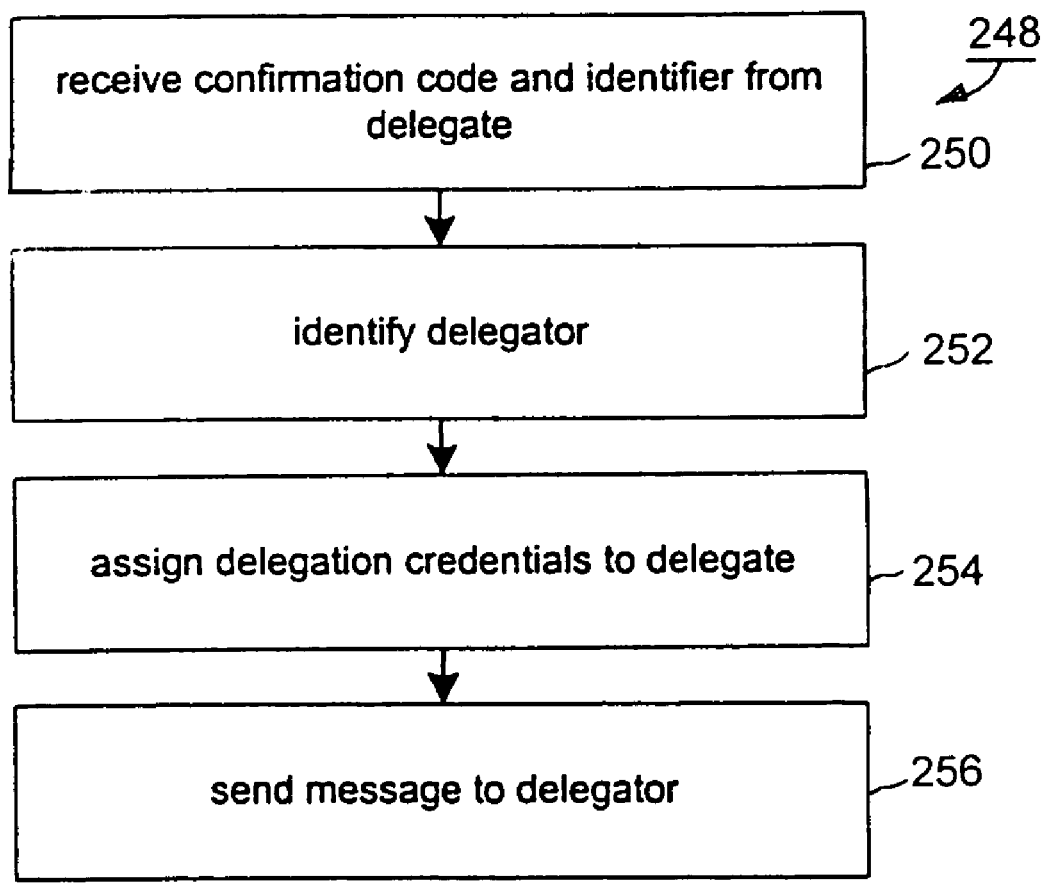
FIG. 8 is a flowchart showing a process for using a confirmation code in the delegation process.

Referring to FIG. 8, a process 248 is shown in which a confirmation code is used to assign a delegation credential to a delegate. Process 248 may be used, for example, in blocks 226 and 228 of process 216 (FIG. 6).

In process 248, a delegator decides to assign a delegation. To do this, the delegator may visit a delegation Web site (not shown) and select the roles that are to be assigned to the delegate. For example, the delegator may select, from the Web site, professional titles, such as secretary, technician, etc., that define the roles. The delegator then provides (e.g., via the Web site) a confirmation code. The confirmation code may be a random N-digit alphanumeric sequence (where N>1). The Web site may hash the confirmation code using a cryptographic hash function, such as SHA-1. The delegator approves the selected roles and confirmation code (hashed or non-hashed) using his digital credential. DSP 206 receives the confirmation code or hashed confirmation code.

DSP 208 receives the confirmation code, the selected roles, and an identifier for the delegator. The identifier may be a name or number that corresponds to, e.g., identifies, the delegator. DSP 208 stores this information in database 214. The delegator provides the confirmation code and the identifier to the delegate. This information may be provided by hand, electronic mail, or some other secure method that is independent of the delegation processes described herein.

The delegate enters the identifier and the confirmation code into an appropriate area of the delegation Web site. DSP 208 receives (250) the identifier and the confirmation code from the Web site and identifies (252) the delegator using this information. This may be done by comparing the identifier to a pre-stored identifier for the delegator and/or checking the hash of the confirmation code for correctness. DSP 208 may then assign (254) the appropriate delegation credential(s) to the delegate and send (256) a confirmation of the delegation to the delegator.

An alternative to process 248, DSP 208 may receive, from a delegate, a delegation request for a role of the delegator; receive a confirmation code from the delegate; receive, from the delegator, a request for outstanding delegation requests; request approval from the delegator of an outstanding delegation request from the delegate; and receive the confirmation code from the delegator in response to requesting approval. DSP 208 may confirm approval of the outstanding delegation request using the confirmation code.

In more detail, the delegate may visit a DSP Web site (not shown) and identify the delegator by name or by selecting the delegator from a displayed list of delegators. The delegate may also enter the role(s) of the delegator that the delegate would like to assume, along with a confirmation code. The Web site may hash the confirmation code and provide the hashed results, along with the identities of the delegate and the requested role(s) to DSP 208, where they are received. DSP 208 stores the request and the hash of the confirmation code in database 214.

The delegate provides the confirmation code to the delegator. As was the case above, the confirmation code may be provided to the delegator by hand, electronic mail, or some other secure method that is independent of the delegation processes described herein.

The delegator may request, e.g., via a DSP Web site (not shown), outstanding delegation requests that relate to the delegator. That is, the delegator may ask DSP 208 who (which delegates) have requested roles of the delegator and which roles have been requested. DSP 208 receives the request from the delegator and provides the delegator with a list of the outstanding delegation requests. The list may include the requesting delegates and the role(s) that they have requested. Along with providing the list, DSP 208 requests that the delegator approve of the outstanding delegation request of the delegate.

To approve of the outstanding delegation request from the delegate, the delegator provides the confirmation code to DSP 208, along with the delegator's digital credential. DSP 208 receives the confirmation code and the digital credential. DSP 208 checks a hash of the confirmation code against a stored hash of the confirmation code and the digital credential of the delegator against a stored digital credential of the delegator. If both match, DSP 208 approves the outstanding delegation credential request of the delegate and stores the approval in database 214.

Process 248 reduces the problem of name similarity and name collision in secured communications. That is, use of a confirmation code, along with the digital credentials, provides a back-up identifier for the user.

In other embodiments, the confirmation code could be generated by the DSP Web site instead of by the delegator. The delegator could send the actual confirmation code instead of the hash of the confirmation code. There could be a time-out on the confirmation code so that if the confirmation code is not entered within a predetermined period of time, the confirmation code is invalidated. The delegate could store the delegation information instead of storing it on DSP 208.

Processes 216, 230 and 248 are not limited to use with the hardware of FIG. 4; they may find applicability in any computing or processing environment. Processes 216, 230 and 248 may be implemented in hardware, software, or a combination of the two. Processes 216, 230 and 248 may be implemented in one or more computer programs executing on programmable computers that each include a processor, a storage medium readable by the processor (including volatile and non-volatile memory and/or storage elements), at least one input device, and one or more output devices. Program code may be applied to data entered using an input device to perform processes 216, 230 and 248 and to generate output information. The output information may be applied to one or more output devices.

Each such program may be implemented in a high level procedural or object-oriented programming language to communicate with a computer system. However, the programs can be implemented in assembly or machine language. The language may be a compiled or an interpreted language.

Each computer program may be stored on an article of manufacture, e.g., a storage medium, such as a CD-ROM, hard disk, or magnetic diskette, that is readable by a general or special purpose programmable computer for configuring and operating the computer when the storage medium or device is read by the computer to perform processes 216, 230 and 248. Processes 216, 230 and 248 may also be implemented as a computer-readable storage medium, configured with a computer program, where, upon execution, instructions in the computer program cause the computer to operate in accordance with processes 216, 230 and 248.

The invention has been described with reference to a variety of embodiments. These and other embodiments not specifically described herein are within the scope of the following claims.

What is claimed is:

1. A method comprising:
   using a delegation service provider to:
      receive, from a delegator, a designation of a role and a delegate to assume the role;
      receive, from a credential service provider, an indication that the designation is valid;
      generate a delegation credential in response to receiving the indication; and
      provide the delegation credential to the delegator or delegate; and
   using the credential service provider to:
      receive the delegation credential as part of a process for accessing a service;

receive an access requirement for accessing the service, the access requirement being received from a relying party that provides the service;
determine if the delegation credential is valid for the access requirement, wherein determining if the delegation credential is valid comprises providing the delegation credential to a verification service that compares the delegation credential to pre-existing delegation credentials that correspond to the access requirement; and
enable access to the service if the delegation credential comprises a valid delegation credential for the delegate.

2. The method of claim 1, wherein the delegation credential allows the delegate to access the service.

3. The method of claim 1, wherein the delegation service provider issues a confirmation to the delegator which indicates that the delegation credential was generated.

4. The method of claim 1, wherein the delegator can delegate multiple functions, the role comprising one of the multiple functions.

5. The method of claim 1, wherein the delegation credential is provided from the delegation service provide to, and stored by, at least one of the delegate and the credential service provider.

6. The method of claim 1, wherein multiple delegation credentials correspond to the access requirement and the credential service provider provides the multiple delegation credentials to the delegate.

7. The method of claim 6, wherein the delegate selects the delegation credential from among the multiple delegation credentials for use by the credential serviced provider.

8. A method comprising:
receiving a request for a delegate to access a service;
obtaining delegation credentials for the delegate;
determining which of the delegation credentials correspond to an access requirement for the service;
providing, to the delegate, delegation credentials that correspond to the access requirement;
receiving, from the delegate, an indication corresponding to a selected delegation credential;
sending the selected delegation credential to a verification service that compares the selected delegation credential to permissible delegation credentials for the delegate; and
using the selected delegation credential to access the service if the selected delegation credential comprises a permissible delegation credential for the delegate.

9. The method of claim 8, wherein sending is performed prior to using the selected delegation credential to access the service.

10. The method of claim 8, further comprising:
receiving an indication that the selected delegation credential is valid prior to using the selected delegation credential to access the service.

11. An article comprising one or more machine-readable media that store executable instructions that cause one or more machines to:

receive, from a delegator, a designation of a role and a delegate to assume the role;
receive, from a credential service provider, an indication that the designation is valid;
generate a delegation credential in response to receiving the indication;
provide the delegation credential to the delegator or delegate
receive the delegation credential as part of a process for accessing a service;
receive an access requirement for accessing the service, the access requirement being received from a relying party that provides the service;
determine if the delegation credential is valid for the access requirement, wherein determining if the delegation credential is valid comprises providing the delegation credential to a verification service that compares the delegation credential to pre-existing delegation credentials that correspond to the access requirement; and
enable access to the service if the delegation credential comprises a valid delegation credential for the delegate.

12. The article of claim 11, wherein the delegation credential allows the delegate to access the service.

13. The article of claim 11, further comprising instructions that cause the one or more machines to:
issue a confirmation to the delegator which indicates that the delegation credential was generated.

14. The article of claim 11, wherein the delegator can delegate multiple functions, the role comprising one of the multiple functions.

15. The article of claim 11, wherein the delegation credential is issued to, and stored by, at least one of the delegate and a credential service provider.

16. An article comprising a machine-readable medium that stores executable instructions that cause a machine to:
receive a request for a delegate to access a service;
obtain delegation credentials for the delegate;
determine which of the delegation credentials correspond to an access requirement for the service;
provide, to the delegate, delegation credentials that correspond to the access requirement;
receive, from the delegate, an indication corresponding to a selected delegation credential;
send a selected delegation credential to a verification service that compares the selected delegation credential to permissible delegation credentials for the delegate; and
use the selected delegation credential to access the service if the selected delegation credential comprises a permissible delegation credential for the delegate.

17. The article of claim 16, wherein sending is performed prior to using the selected delegation credential to access the service.

18. The article of claim 16, further comprising instructions that cause the machine to:
receive an indication that the selected delegation credential is valid prior to using the selected delegation credential to access the service.

* * * * *